United States Patent Office 3,209,049
Patented Sept. 28, 1965

3,209,049
PROCESS FOR IMPROVING ALKALIZED IRON
DEHYDROGENATION CATALYSTS
Emory W. Pitzer, Bartlesville, Okla., assignor to Phillips
Petroleum Company, a corporation of Delaware
No Drawing. Filed Dec. 21, 1961, Ser. No. 161,280
13 Claims. (Cl. 260—680)

This invention relates to a process for improving the selectivity of steam-active alkalized iron dehydrogenation catalysts and to the dehydrogenation of dehydrogenatable hydrocarbons therewith.

Steam-active dehydrogenation catalysts are widely used in the dehydrogenation of olefins to diolefins, e.g., butenes to butadiene; alkyl-aromatics to alkenylaromatics, e.g., ethylbenzene to styrene; and alkylpyridenes to alkenyl-pyridines, e.g., 2-methyl-5-ethylpyridene to 2-methyl-5-vinylpyridine. These catalysts and the dehydrogenation conditions and other operating data are disclosed in Pitzer 2,866,790, Gutzeit 2,408,140, and Eggertsen et al. 2,414,585. The steam-active alkalized iron dehydrogenation catalysts disclosed in these patents contain a predominant amount of iron oxide and potassium carbonate with a minor but effective amount of chromium oxide incorporated therein. The iron oxide and potassium carbonate usually constitute at least 90 weight percent of the catalyst, the balance consisting essentially of 1 to 10 weight percent of chromium oxide. The iron oxide content runs from about 35 or 40 weight percent up to 90–98 percent of the catalyst. Such catalysts are normally used in the dehydrogenation of hydrocarbons at temperatures in the range of 1050 to 1300° F. with a steam-to-hydrocarbon ratio in the range of 5 to 1 to 25–1 and pressures of about atmospheric or somewhat higher.

Plants for these dehydrogenation processes normally operate with large outputs and require large amounts of feed. Thus, even small improvements in selectivity of conversion to the desired product result in substantial savings in feed costs. The present invention is concerned with a treatment of dehydrogenation catalysts which improve their selectivity.

Accordingly, a principal object of the invention is to provide a process for improving the selectively of steam-active alkalized iron dehydrogenation catalysts. Another object is to provide an improved dehydrogenation process for the conversion of dehydrogenatable hydrocarbons to less saturated hydrocarbons such as olefins to diolefins, alkylaromatics to alkenylaromatics, and alkylpyridenes to alkenylpyridines. Other objects of the invention will become apparent upon consideration of the accompanying disclosure.

A broad aspect of the invention comprises treating steam-active alkalized iron dehydrogenation catalyst with ammonia at elevated temperatures so as to increase the selectivity of the catalyst for conversion of feed to the desired product. The invention is particularly applicable to the dehydrogenation of $C_4$ to $C_6$ olefins to the corresponding diolefins. The treatment with ammonia is effected either in the process cycle or in a catalyst steaming period during which no hydrocarbon is being dehydrogenated. The ammonia can be charged as such, or compounds yielding ammonia under the operating conditions can be utilized. Compounds such as ammonium carbonate, ammonium bicarbonate, ammonium carbamate, and urea, under the conditions prevailing in preheating furnaces and the catalyst chambers, decompose to yield ammonia and are suitable for use in this process.

The ammonia treatment can be carried out in the process cycle or in a steaming period, and further can be either a continuous or intermittent treatment. The effect of the treatment lasts for several hours after the ammonia is cut out of the catalyst chamber, so continuous treatment is not necessary. The ammonia is ordinarily included in the feed to the catalyst chamber at an hourly rate of 5 to 100 volumes (STP), based on the volume of catalyst being treated. Intermittent treatment is ordinarily carried out for periods of 5 minutes to 4 hours, preferably 20 minutes to 2 hours. A ratio of steam to ammonia in the range of 1:1 to 25:1 is effective in practicing the invention.

The ammonia treatment is conducted at a temperature in the range of about 1050–1300° F. for a period of at least 5 minutes and up to 2 hours.

The following examples are presented to illustrate the invention and are not to be construed as unnecessarily limiting the invention.

EXAMPLE I

A catalyst consisting of 45 weight percent $Fe_2O_3$, 52 weight percent $K_2CO_3$, and 3 weight percent $Cr_2O_3$ was used for butene dehydrogenation to produce butadiene. This catalyst is described in U.S. Patent 2,866,790. The operating conditions during dehydrogenation were 1130° F., 12/1 steam/hydrocarbon ratio, 400 gas volumes (STP) an hour based on the catalyst volume, and one atmosphere total pressure.

The effect of treating the catalyst with an ammonia/steam mixture was tested using a one-hour treatment with a 1/120 volume ratio mixture. The sequence of operation was (1) dehydrogenation, (2) ammonia treatment effected by cutting out the hydrocarbon and adding ammonia in the ratio given, and (3) returning to dehydrogenation conditions without ammonia being added to the feed. Dehydrogenation test data shown below were obtained (A) immediately before ammonia treatment, (B) immediately after ammonia treatment, and (C) 4 hours after ammonia treatment.

(A) Immediately before $NH_3$ treatment:

Yield _____ 20.5
Conversion _____ 25.0
Selectivity _____ 82.1

(B) Immediately after $NH_3$ treatment:

|  | Change effected by $NH_3$ treatment |
|---|---|
| Conversion | 25.4 |
| Yield | 21.2 |
| Selectivity | 83.2 |

(C) Four hours after $NH_3$ treatment:

|  | Change effected by $NH_3$ treatment |
|---|---|
| Conversion | 25.2 |
| Yield | 20.8 |
| Selectivity | 82.7 |

The improvement remaining after 4 hours on dehydrogenation was gradually lost over the next 20 hours.

As a basis for comparison, similar treatments were carried out using each of hydrogen, carbon monoxide, and air; and no improvement in selectivity was effected by these treatments.

It is shown in Patent 2,866,790 (Example I) that steaming alone does not improve this catalyst for conversion of 2-butene to butadiene; and steam actually acts as a temporary poison.

EXAMPLE II

The following tests were carried out using the catalyst of Example I and conditions of 1200° F., 400 gas volumes (STP) of butenes based on the catalyst volume, 12/1 steam-to-hydrocarbon ratio, and one atmosphere pressure. The tests were conducted by adding ammonia to the feed in the amount specified, the remainder of the feed rates being held constant. Thus the contact time during ammonia addition was reduced slightly.

Data for three tests are shown in the tables below, each with a comparison test with the catalyst without ammonia treatment.

TEST D

| $NH_3$ Space Velocity | Conversion | Butadiene Yield | Selectivity | $CO_2$ Yield |
|---|---|---|---|---|
| 20 | 57.51 | 37.65 | 65.46 | 24.74 |
| 0 | 58.75 | 37.15 | 63.24 | 29.26 |
| Change by $NH_3$ | −1.24 | +0.50 | +2.22 | −4.52 |

TEST E

| | Conversion | Butadiene Yield | Selectivity | $CO_2$ Yield |
|---|---|---|---|---|
| 60 | 57.85 | 37.71 | 65.19 | 21.04 |
| 0 | 57.75 | 37.15 | 63.24 | 29.26 |
| Change by $NH_3$ | −0.90 | +0.56 | +1.95 | −8.24 |

Four hours after ammonia addition had been stopped, improved catalyst performance was still evident. The test data are shown below along with the data for the comparative test before ammonia addition.

TEST F

| Test | Conversion | Butadiene Yield | Selectivity | $CO_2$ Yield |
|---|---|---|---|---|
| After $NH_3$ | 57.43 | 38.01 | 66.19 | 32.92 |
| Before $NH_3$ | 58.75 | 37.15 | 63.24 | 29.26 |
| Change by $NH_3$ | −1.32 | +0.86 | +2.95 | −5.34 |

From the data of this last test, it is evident that intermittent addition of ammonia in the process cycle can be practiced with good results.

Cetain modifications of the invention will become apparent to those skilled in the art and the illustrative details disclosed are not to be construed as imposing unnecessary limitations on the invention.

I claim:

1. In a process for dehydrogenating a monoolefin in vapor form in contact with a steam-active catalyst consisting essentially of a predominant amount of iron oxide and potassium carbonate and a minor but effective amount of chromium oxide in a reaction zone under dehydrogenating conditions in admixture with steam, the improvement comprising contacting said catalyst at a temperature in the range of 1050 to 1300° F. with ammonia in vapor form for a period of at least 5 minutes so as to improve the selectivity thereof in said process.

2. The process of claim 1 wherein a $C_4$ to $C_6$ olefin is dehydrogenated to the corresponding diolefin.

3. The process of claim 1 wherein butene is dehydrogenated to butadiene.

4. The process of claim 1 wherein a $C_4$ to $C_6$ olefin is dehydrogenated to a corresponding diolefin and ammonia is fed to the reaction zone.

5. The process of claim 4 wherein ammonia is intermittently fed to the reaction zone for periods in the range of about 5 minutes to 4 hours at intervals of up to about 20 hours.

6. The process of claim 1 wherein ammonia is fed to the reaction zone.

7. In a process for dehydrogenating 2-butene to butadiene comprising contacting 2-butene in admixture with steam in a reaction zone with a steam-active catalyst consisting essentially of a predominant proportion of iron oxide and potassium carbonate and a minor amount of chromium oxide under dehydrogenating conditions to produce butadiene, the improvement comprising contacting said catalyst with ammonia at a temperature in the range of about 1050 to 1300° F. for a period of at least 5 minutes.

8. The process of claim 7 wherein ammonia is passed to said reaction zone at an hourly rate of 5 to 100 volumes under standard temperature and pressure, based on the volume of catalyst.

9. The process of claim 8 wherein ammonia is passed intermittently to said reaction zone for periods of 5 minutes to 4 hours at intervals up to 20 hours.

10. A process for improving the selectivity of a dehydrogenation catalyst for dehydrogenation of hydrocarbons, such as the dehydrogenation of 2-butene to butadiene, said catalyst consisting essentially of a predominant amount of iron oxide and potassium carbonate and a minor but effective amount of chromium oxide, which comprises contacting said catalyst with ammonia at a temperature in the range of about 1050 to 1300° F. for a period of at least 5 minutes.

11. The process of claim 10 wherein said ammonia is admixed with steam in a ratio of steam to ammonia in the range of 1:1 to 25:1.

12. The process of claim 10 wherein ammonia is passed thru said catalyst at an hourly rate of 5 to 100 volumes under standard temperature and pressure per volume of catalyst.

13. The process of claim 10 wherein the iron oxide and potassium carbonate amount to at least 90 weight percent and the chromium oxide amounts to at least 1 and up to 10 weight percent of said catalyst.

References Cited by the Examiner

UNITED STATES PATENTS

| 2,814,650 | 11/57 | Clark | 260—683.3 |
| 2,856,441 | 10/58 | Murray | 260—683.3 |
| 2,866,791 | 12/58 | Pitzer | 260—680 |

ALPHONSO D. SULLIVAN, *Primary Examiner.*